United States Patent
Yeo et al.

(10) Patent No.: US 10,498,484 B2
(45) Date of Patent: Dec. 3, 2019

(54) METHOD AND APPARATUS FOR ALLOWING DIFFERENT SERVICES TO COEXIST IN WIRELESS CELLULAR COMMUNICATION SYSTEM

(71) Applicant: Samsung Electronics Co., Ltd., Gyeonggi-do (KR)

(72) Inventors: Jeongho Yeo, Hwaseong-si (KR); Youngbum Kim, Seoul (KR); Younsun Kim, Seongnam-si (KR); Jinyoung Oh, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 120 days.

(21) Appl. No.: 15/649,376

(22) Filed: Jul. 13, 2017

(65) Prior Publication Data

US 2018/0019838 A1    Jan. 18, 2018

(30) Foreign Application Priority Data

Jul. 13, 2016 (KR) .......................... 10-2016-0088807

(51) Int. Cl.
*H04W 72/12* (2009.01)
*H04L 1/00* (2006.01)
(Continued)

(52) U.S. Cl.
CPC ............ *H04L 1/0036* (2013.01); *H04L 1/007* (2013.01); *H04L 1/0044* (2013.01);
(Continued)

(58) Field of Classification Search
CPC ... H04L 1/0036; H04L 1/0044; H04L 5/0044; H04L 5/0053; H04L 1/0041;
(Continued)

(56) References Cited

U.S. PATENT DOCUMENTS

2016/0374076 A1* 12/2016 Yang .................... H04B 7/0626
2017/0230994 A1*  8/2017 You ..................... H04W 72/042
(Continued)

FOREIGN PATENT DOCUMENTS

EP       2555555 A2     2/2013

OTHER PUBLICATIONS

European Search Report dated Dec. 8, 2017 in connection with European Patent Application No. 17 18 0923.
(Continued)

*Primary Examiner* — Edan Orgad
*Assistant Examiner* — Vanneilian Lalchinthang

(57) ABSTRACT

The present disclosure relates to a communication method and system for converging a 5th-generation (5G) communication system for supporting higher data rates beyond a 4th-generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. In accordance with an aspect of the present disclosure, a method by a terminal of a mobile communication system includes receiving, from a base station, first control information on first type data; identifying whether second control information on second type data is received from the base station; and terminating decoding of the first type data if the second control information is received.

18 Claims, 13 Drawing Sheets

(51) Int. Cl.
*H04L 5/00* (2006.01)
*H03M 13/29* (2006.01)
*H04W 88/02* (2009.01)
*H04W 88/08* (2009.01)
*H04L 1/16* (2006.01)

(52) U.S. Cl.
CPC .......... *H04L 1/0065* (2013.01); *H04L 5/0044* (2013.01); *H04L 5/0053* (2013.01); *H04L 5/0094* (2013.01); *H04L 1/0003* (2013.01); *H04L 1/1607* (2013.01); *H04L 5/0007* (2013.01); *H04L 5/0055* (2013.01); *H04W 88/02* (2013.01); *H04W 88/08* (2013.01)

(58) Field of Classification Search
CPC .... H04L 1/0045; H04L 1/0054; H04W 88/02; H04W 88/08; H04W 72/1263; H03M 13/2906; H03M 13/2933; H03M 13/3938; H03M 13/6522
USPC .......................................................... 370/328
See application file for complete search history.

(56) References Cited

U.S. PATENT DOCUMENTS

2017/0279464 A1* 9/2017 Noh ...................... H03M 13/116
2017/0289970 A1* 10/2017 Yang .................... H04W 52/146
2017/0353269 A1* 12/2017 Lin ...................... H03M 13/2906
2017/0359148 A1* 12/2017 Richardson ........ H03M 13/1148
2017/0367120 A1* 12/2017 Murray ................ H04W 72/046
2018/0159668 A1* 6/2018 Phuyal .................. H04L 1/1887

OTHER PUBLICATIONS

Mohamed S. Abo Zeid et al., "Efficient Design and Implementation of LTE Downlink Control Information Decoder", International Journal of Computer Theory and Engineering, vol. 6, No. 2, Apr. 2014, 10 pages.
"3rd Generation Partnership Project; Technical Specification Group Radio Access Network; Evolved Universal Terrestrial Radio Access (E-UTRA); Multiplexing and channel coding (Release 13)", 3GPP TS 36.212 v13.2.0, Jun. 2016, 140 pages.
"3rd Generation Partnership Project; Technical Specification Group Radio Access Network; Evolved Universal Terrestrial Radio Access (E-UTRA); Physical layer procedures (Release 10)", 3GPP TS 36.213 v10.13.0, Jun. 2015, 128 pages.
"3rd Generation Partnership Project; Technical Specification Group Radio Access Network; Evolved Universal Terrestrial Radio Access (E-UTRA); Medium Access Control (MAC) protocol specification (Release 13)", 3GPP TS 36.321 v13.2.0, Jun. 2016, 91 pages.
Huawei,HiSilicon, "Support for wide bandwidth for 5G", 3GPP TSG RAN WG1 Meeting #84bis, Apr. 11-15, 2016, 3 pages, R1-162158.

* cited by examiner (a) CHANNEL CODING BLOCK DIAGRAM IN WHICH OUTER CODE IS NOT USED (b) CHANNEL CODING BLOCK DIAGRAM IN WHICH OUTER CODE IS USED

METHOD AND APPARATUS FOR ALLOWING DIFFERENT SERVICES TO COEXIST IN WIRELESS CELLULAR COMMUNICATION SYSTEM

CROSS-REFERENCE TO RELATED APPLICATION

The present application is related to and claims the benefit under 35 U.S.C. § 119(a) of a Korean patent application filed on Jul. 13, 2016, in the Korean Intellectual Property Office and assigned Serial No. 10-2016-0088807, the entire disclosure of which is hereby incorporated by reference.

TECHNICAL FIELD

The present disclosure generally relates to a wireless communication system, and relates to a method and an apparatus for smoothly providing a service in a communication system. More particularly, the present disclosure relates to a method and an apparatus for allowing different services to coexist in a communication system.

BACKGROUND

To meet the demand for wireless data traffic having increased since deployment of 4G communication systems, efforts have been made to develop an improved 5G or pre-5G communication system. Therefore, the 5G or pre-5G communication system is also called a "beyond 4G network" or a "post LTE system." The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid FSK and QAM (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the internet of things (IoT) where distributed entities, such as things, exchange and process information without human intervention. The internet of everything (IoE), which is a combination of the IoT technology and the Big Data processing technology through connection with a cloud server, has emerged. As technology elements, such as "sensing technology," "wired/wireless communication and network infrastructure," "service interface technology," and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (RAN) as the above-described big data processing technology may also be considered to be as an example of convergence between the 5G technology and the IoT technology.

As described above, a plurality of services may be provided to users in a communication system, and in order to provide such services to users, there is a need for a method capable of providing respective services in the same time period to match their features and an apparatus using the method.

SUMMARY

To address the above-discussed deficiencies, it is a primary object to provide a method and an apparatus for simultaneously providing different types of services. Another aspect of the present disclosure provides a method and an apparatus for receiving different types of services in the same time period through acquisition of information that is received to match the features of the respective services if the different types of services are simultaneously provided.

In accordance with an aspect of the present disclosure, a method by a terminal of a mobile communication system includes receiving, from a base station, first control information on first type data; identifying whether second control information on second type data is received from the base station; and terminating decoding of the first type data if the second control information is received.

In accordance with another aspect of the present disclosure, a method by a base station of a mobile communication system includes transmitting, to a terminal, first control information on first type data; transmitting, to the terminal, second control information on second type data; and determining whether to terminate transmission of the first type data that corresponds to the first control information based on at least one of the first control information and the second control information.

In accordance with still another aspect of the present disclosure, a terminal in a mobile communication system includes a transceiver; and a controller configured to control the transceiver to: receive, from a base station, first control information on first type data from a base station, identify whether second control information on second type data is received from the base station, and terminate decoding of the first type data if the second control information is received.

In accordance with yet still another aspect of the present disclosure, a base station in a mobile communication system includes a transceiver; and a controller configured to control the transceiver to: receive, from a base station, first control information on first type data from a base station, identify whether second control information on second type data is received from the base station, and terminate decoding of the first type data if the second control information is received.

According to the aspects of the present disclosure, data can be effectively transmitted using different types of services in a communication system. Further, according to the aspects of the present disclosure, since a method for allowing data transmission between different services to coexist is provided, the requirements according to respective services can be satisfied, and it is possible to reduce delay of a transmission time or to efficiently use at least one of frequency-time and spatial resources.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
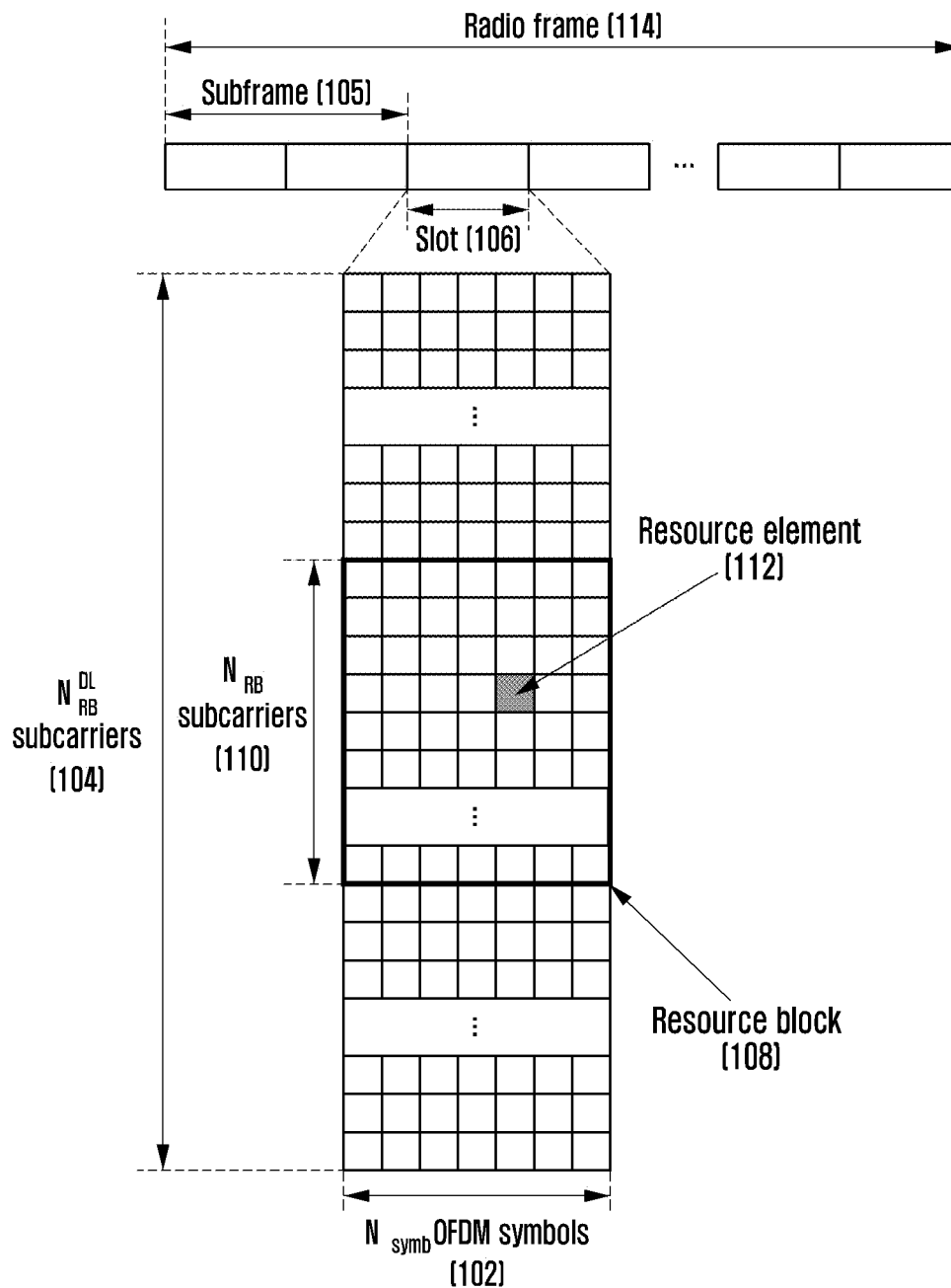
FIG. 1 illustrates a downlink time-frequency domain transmission structure of an LTE or LTE-A system of the present disclosure.

FIGS. 1 through 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device.

Hereinafter, preferred embodiments of the present disclosure will be described in detail with reference to the accompanying drawings.

In explaining embodiments of the present disclosure, explanation of technical contents which are well known in the art to which the present disclosure pertains and are not directly related to the present disclosure will be omitted. This is to transfer the subject matter of the present disclosure more clearly without obscuring the same through omission of unnecessary explanations.

For the same reason, in the accompanying drawings, sizes and relative sizes of some constituent elements may be exaggerated, omitted, or briefly illustrated. Further, sizes of the respective constituent elements do not completely reflect the actual sizes thereof. In the drawings, the same drawing reference numerals are used for the same or corresponding elements across various figures.

The aspects and features of the present disclosure and methods for achieving the aspects and features will be apparent by referring to the embodiments to be described in detail with reference to the accompanying drawings. However, the present disclosure is not limited to the embodiments disclosed hereinafter, but can be implemented in diverse forms. The matters defined in the description, such as the detailed construction and elements, are nothing but specific details provided to assist those of ordinary skill in the art in a comprehensive understanding of the disclosure, and the present disclosure is only defined within the scope of the appended claims. In the entire description of the present disclosure, the same drawing reference numerals are used for the same elements across various figures.

In this case, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Also, each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The term "~unit," as used in an embodiment, means, but is not limited to, a software or hardware component, such as FPGA or ASIC, which performs certain tasks. However, "~unit" does not mean to be limited to software or hardware. The term "~unit" may advantageously be configured to reside on the addressable storage medium and configured to execute on one or more processors. Thus, "~unit" may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and "~units" may be combined into fewer components and "~units" or further separated into additional components and "~units." Further, the components and "units" may be implemented to operate one or more CPUs in a device or a security multimedia card. Further, in an embodiment, "unit" may include one or more processors.

A wireless communication system was initially developed for the purpose of providing a voice-oriented service, but has been expanded to, for example, a broadband wireless communication system that provides a high-speed and high-quality packet data service like communication standards, such as 3GPP high speed packet access (HSPA), long term evolution (LTE) or evolved universal terrestrial radio access (E-UTRA), LTE-advanced (LTE-A), 3GPP2 high rate packet data (HRPD), ultra mobile broadband (UMB), and IEEE 802.16e. Further, as the 5th generation wireless communication system, 5G or new radio (NR) communication standards have been made.

In the wireless communication system including the 5th generation as described above, at least one service of enhanced mobile broad band (eMBB), massive machine type communications (mMTC), and ultra-reliable and low-latency communications (URLLC) may be provided to a terminal. The above-described services may be provided to the same terminal during the same time period. In an embodiment, among the above-described services, eMBB may take aim at high-speed transmission of high-capacity data, mMTC may take aim at minimization of a terminal power and connection among plural terminals, and URLLC may take aim at high reliability and low delay, but are not limited thereto. The three kinds of services as described above may be primary scenarios in an LTE system or post-LTE 5G/new radio or next radio (NR) systems. In an embodiment, a coexistence method between eMBB and URLLC or between mMTC and URLLC, and an apparatus using the method will be described.

If a situation in which a base station may transmit URLLC data in a specific transmission time interval (TTI) occurs in a state where the base station is scheduled to transmit data that corresponds to an eMBB service to a certain terminal in the TTI, the base station may not transmit a part of the eMBB data in a frequency band in which the eMBB data has already been scheduled and transmitted, but may transmit the generated URLLC data in the frequency band. The eMBB-scheduled terminal and the URLLC-scheduled terminal may be the same terminal or different terminals. In this case, since a part of the eMBB data that has already been scheduled and transmitted may not be transmitted, a possibility that the eMBB data is lost is increased. Accordingly, it is necessary to determine a method for processing a signal that is received from the eMBB-scheduled terminal or the URLLC-scheduled terminal and a method for receiving the signal. In an embodiment, a coexistence method between different services will be described, which can transmit information according to the respective services if information according to the eMBB and the URLLC is scheduled through sharing of a part or the whole of the frequency band, if information according to the mMTC and the URLLC is simultaneously scheduled, if information according to the mMTC and the eMBB is simultaneously scheduled, or if information according to the eMBB, the URLLC, and the mMTC is simultaneously scheduled.

Hereinafter, exemplary embodiments of the present disclosure will be described in detail with reference to the accompanying drawings. In describing the present disclosure, a detailed description of related functions or configurations will be omitted if it is determined that it obscures the disclosure in unnecessary detail. Further, all terms used in the description are general terms that are widely used in consideration of their functions in the present disclosure, but may differ depending on intentions of a person skilled in the art to which the present disclosure belongs, customs, or appearance of new technology. Accordingly, they should be defined based on the contents of the whole description of the present disclosure.

Hereinafter, the base station is the subject that performs resource allocation to the terminal, and may be at least one of an eNode B, Node B, base station (BS), radio connection unit, base station controller, and node on a network. The terminal may include user equipment (UE), mobile station (MS), cellular phone, smart phone, computer, or a multimedia system that can perform a communication function. In the present disclosure, a downlink (DL) is a radio transmission path of a signal that is transmitted from the base station to the terminal, and an uplink (UL) means a radio transmission path of a signal that is transmitted from the terminal to the base station. Hereinafter, although an embodiment of the present disclosure is described in a state where an LTE or LTE-A system is exemplified, it is also possible to apply the embodiment of the present disclosure even to other communication systems having similar technical backgrounds or channel types. For example, the 5th generation mobile communication technologies (5G, new radio, and NR) that are developed after LTE-A may be included therein. Further, the embodiment of the present disclosure may also be applied to other communication systems through partial modifications thereof in a range that does not greatly deviate from the scope of the present disclosure through the judgment of those skilled in the art.

In the LTE system that is a representative example of the broadband wireless communication systems, the downlink (DL) adopts an orthogonal frequency division multiplexing (OFDM) scheme, and the uplink (UL) adopts single carrier frequency division multiple access (SC-FDMA) scheme. The uplink means a radio link in which a terminal (or user equipment (UE)) or a mobile station (MS) transmits data or a control signal to a base station (BS) (or eNode B), and the downlink means a radio link in which the base station transmits data or a control signal to the terminal. According to the above-described multiple access schemes, data of respective users or control information can be discriminated from each other by performing an allocation and an operation so as to prevent time-frequency resources for carrying the data or control information for each user from overlapping each other, that is, to establish orthogonality.

The LTE system adopts a hybrid automatic repeat request (HARD) scheme in which a physical layer retransmits the corresponding data if decoding failure occurs during initial data transmission. According to the HARQ scheme, a receiver may transmit information (negative acknowledgement (NACK)) for notifying of the decoding failure to a transmitter if the receiver is unable to accurately decode the data, and the transmitter may make the physical layer retransmit the corresponding data. The receiver may combine the data that is retransmitted from the transmitter with the previous data of which the decoding has failed to heighten the data reception performance. Further, if the receiver has accurately decoded the data, the receiver may transmit information (acknowledgement (ACK)) for notifying the transmitter of decoding success, and the transmitter can transmit new data.

FIG. 1 illustrates the basic structure of a time-frequency domain that is a radio resource region in which a downlink transmits the data or control channel in an LTE system or a system that is similar to the LTE system.

Referring to FIG. 1, a horizontal axis represents a time domain, and a vertical axis represents a frequency domain. In the time domain, the minimum transmitter is an OFDM symbol, and $N_{symb}$ OFDM symbols 102 constitute one slot 106, and two slots constitute one subframe 105. The length of the slot is 0.5 ms, and the length of the subframe is 1.0 ms. Further, a radio frame 114 is a time domain region that is composed of 10 subframes. In the frequency domain, the minimum transmitter is a subcarrier, and the transmission bandwidth of the whole system is composed of $N_{BW}$ subcarriers 104 in total. However, such numerical values may be variably applied.

In the time-frequency domain, the basic unit of resources is a resource element (RE) 112 that may be expressed by an OFDM symbol index and a subcarrier index. A resource block (RB) (or physical resource block (PRB)) 108 may be defined by $N_{symb}$ successive OFDM symbols 102 in the time domain and $N_{RB}$ successive subcarriers 110 in the frequency domain. Accordingly, in one slot, one RB 108 may include $N_{symb} \times N_{RB}$ REs 112. In general, as the minimum allocation unit of frequency domain data in the RB or LTE system, $N_{symb}=7$, $N_{RB}=12$, and $N_{BW}$ and $N_{RB}$ may be in proportion to the bandwidth of the system transmission band. The data rate is increased in proportion to the number RBs that are scheduled in the terminal. The LTE system may define and operate 6 transmission bandwidths. In the case of an FDD system that operates to discriminate a downlink and an uplink by means of frequency, the downlink transmission bandwidth and the uplink transmission bandwidth may differ from each other. A channel bandwidth presents an RF bandwidth that corresponds to the system transmission bandwidth. Table 1 below presents the corresponding relationship between the system transmission bandwidth that is defined by the LTE system and the channel bandwidth. For example, the LTE system having 10 MHz channel bandwidth may have the transmission bandwidth that is composed of 50 RBs.

TABLE 1

| | Channel bandwidth $BW_{Channel}$ [MHz] | | | | | |
|---|---|---|---|---|---|---|
| | 1.4 | 3 | 5 | 10 | 15 | 20 |
| Transmission bandwidth configuration $N_{RB}$ | 6 | 15 | 25 | 50 | 75 | 100 |

Downlink control information may be transmitted within initial N OFDM symbols in the subframe. In an embodiment, in general, N={1, 2, 3}. Accordingly, in accordance with the amount of the control information to be transmitted to the current subframe, the N value may be variably applied to each subframe. The transmitted control information may include a control channel transmission period indicator indicating how many OFDM symbols the control information is transmitted through, scheduling information on downlink data or uplink data, and information on HARQ ACK/NACK.

In the LTE system, the scheduling information on the downlink data or the uplink data is transferred from the base station to the terminal through downlink control information (DCI). The DCI may be defined in accordance with various formats, and may indicate whether the DCI is scheduling information on the uplink data (UL grant) or scheduling information on the downlink data (DL grant) according to the respective formats, whether the DCI is a compact DCI having a small size of the control information, whether spatial multiplexing using multiple antennas is applied, and whether the DCI is a DCI for power control. For example, DCI format 1 that is the scheduling control information on the downlink data (DL grant) may include at least one piece of the following control information.

Resource allocation type 0/1 flag: This indicates whether a resource allocation scheme is of type 0 or type 1. The type 0 allocates resources in the unit of a resource block group (RBG) through application of a bitmap scheme. In the LTE system, the basic unit of scheduling is an RB that is expressed as time and frequency domain resource, and the RBG is composed of a plurality of RBs, and becomes the basic unit of scheduling in the type 0 scheme. The type 1 allocates a specific RB in the RBG.

Resource block assignment: This indicates an RB that is allocated for data transmission. An expressed resource is determined in accordance with the system bandwidth and the resource allocation scheme.

Modulation and coding scheme (MCS): This indicates a modulation scheme that is used for data transmission and the size of a transport block that is data to be transmitted.

HARQ process number: This indicates a process number of a HARQ.

New data indicator: This indicates whether a HARQ is initially transmitted or retransmitted.

Redundancy version: This indicates a redundancy version of a HARQ.

Transmission power control (TCP) command for a physical uplink control channel (PUCCH): This indicates a transmission power control command for a PUCCH that is an uplink control channel.

The DCI may pass through a channel coding and modulation process, and may be transmitted on a physical downlink control channel (PDCCH) that is a downlink physical control channel (or control information) or on an Enhanced PDCCH (EPDCCH) (or enhanced control information).

In general, the DCI is scrambled with a specific radio network temporary identifier (RNTI) (or terminal identifier), independently with respect to each terminal, is added with a cyclic redundancy check (CRC), is channel-coded, and then is configured as an independent PDCCH to be transmitted. In the time domain, the PDCCH is mapped during the control channel transmission period to be transmitted. The frequency domain mapping location of the PDCCH may be determined by an identifier (ID) of each terminal, and may be spread to the whole system transmission band to be transmitted.

The downlink data may be transmitted on a physical downlink shared channel (PDSCH) that is a physical channel for transmitting the downlink data. The PDSCH may be transmitted after the control channel transmission period, and scheduling information, such as a detailed mapping location in the frequency domain and the modulation scheme, is determined based on the DCI that is transmitted through the PDCCH.

Through an MCS among the control information that constitutes the DCI, the base station reports to the terminal the modulation scheme that is applied to the PDSCH to be transmitted and the transport block size (TBS) of the data to be transmitted. In an embodiment, the MCS may be composed of 5 bits or more or less. The TBS corresponds to the size before a channel coding for error correction is applied to the data, that is, transport block (TB), which the base station intends to transmit.

The modulation scheme that is supported by the LTE system may be quadrature phase shift keying (QPSK), 16 quadrature amplitude modulation (16QAM), and 64QAM, and respective modulation orders Qm correspond to 2, 4, and 6. That is, in the case of QPSK modulation, 2 bits per symbol may be transmitted, and in the case of 16QAM, 4 bits per symbol may be transmitted. Further, in the case of 64QAM, 6 bits per symbol may be transmitted. Further, in accordance with system modification, the modulation scheme of 256QAM or more may be used.

Figure 2:
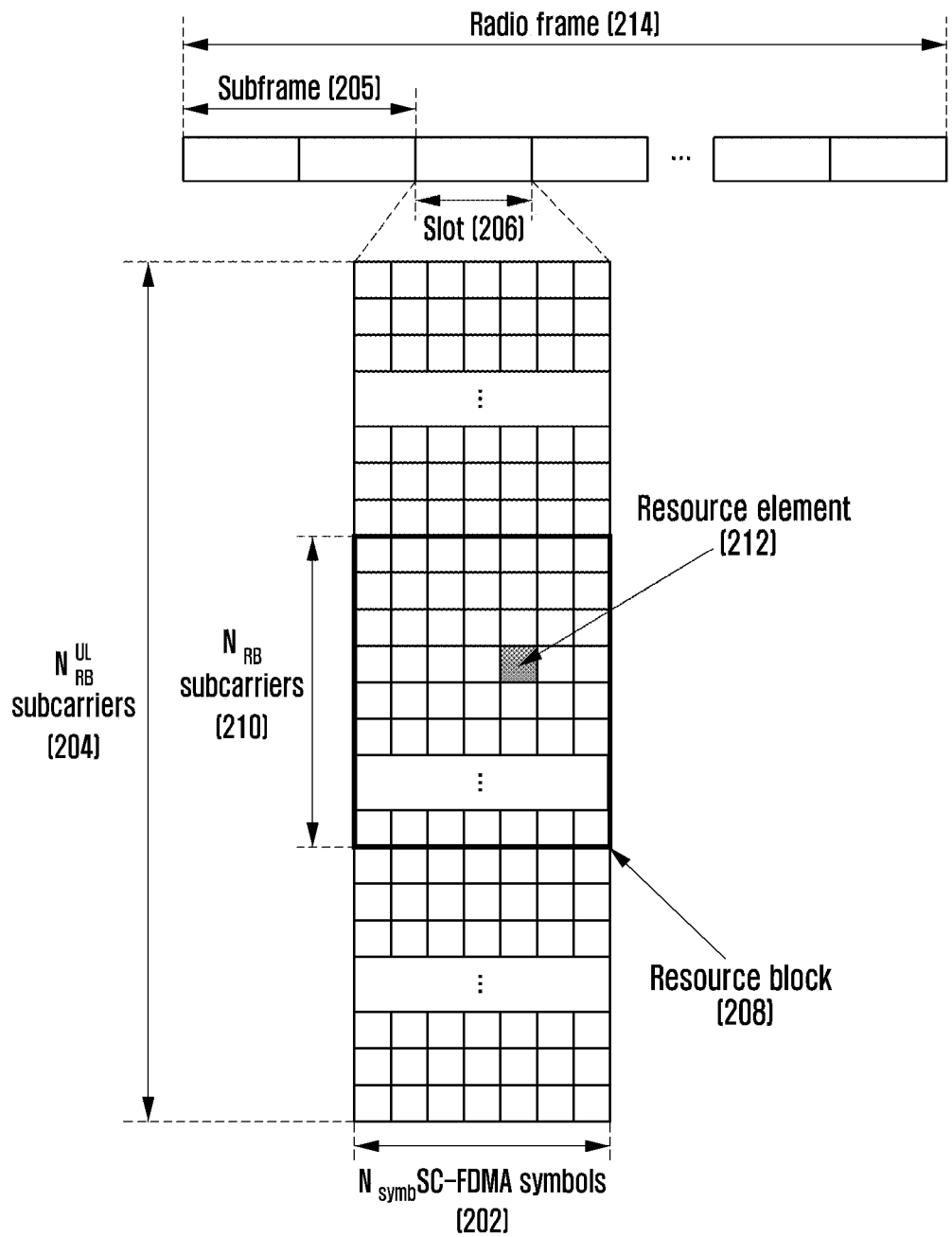
FIG. 2 illustrates an uplink time-frequency domain transmission structure of an LTE or LTE-A system of the present disclosure.

FIG. 2 illustrates the basic structure of a time-frequency domain that is a radio resource region in which an uplink transmits data or a control channel in an LTE-A system.

Referring to FIG. 2, a horizontal axis represents a time domain, and a vertical axis represents a frequency domain. In the time domain, the minimum transmitter is a SC-FDMA symbol 202, and $N_{symb}^{UL}$ SC-FDMA symbols may constitute one slot 206. Further, two slots constitute one subframe 205. In the frequency domain, the minimum transmitter is a subcarrier, and the transmission bandwidth 204 of the whole system is composed of $N_{BW}$ subcarriers in total. $N_{BW}$ may have a value that is proportion to the system transmission bandwidth.

In the time-frequency domain, the basic unit of resources is a resource element (RE) 212 that may be defined by an SC-FDMA symbol index and a subcarrier index. A resource block pair (RB pair) 208 may be defined by $N_{symb}^{UL}$ successive SC-FDMA symbols in the time domain and $N_{sc}^{RB}$ successive subcarriers in the frequency domain. Accordingly, one RB may be composed of $N_{symb}^{UL} \times N_{sc}^{RB}$ REs. In general, the minimum transmitter of data or control information is an RB unit. The PUCCH is mapped on the frequency domain that corresponds to 1 RB, and is transmitted for one subframe.

In the LTE system, the timing relationship may be defined among a PDSCH that is a physical channel for transmitting downlink data, a PUCCH that is an uplink physical channel in which HARQ ACK/NACK that corresponds to PDCCH/EPDDCH that includes a semi-persistent scheduling release (SPS release) is transmitted, and a PUSCH. As an example, In the LTE system that operates as a frequency division duplex (FDD), the PDSCH that is transmitted in the (n−4)-th subframe or the HARQ ACK/NACK that corresponds to the PDCCH/EPDCCH that includes the SPS release may be transmitted to the PUCCH or the PUSCH in the n-th subframe.

In the LTE system, the downlink HARQ adopts an asynchronous HARQ scheme in which a data retransmission time is not fixed. That is, if the base station receives a feedback of the HARQ NACK from the terminal with respect to initial transmission data that is transmitted by the base station, the base station freely determines the transmission time of the retransmission data by a scheduling operation. The terminal performs buffering of data that is determined as an error as the result of decoding the received data for the HARQ operation, and then performs combining of the error data with next retransmission data.

If the PDSCH that includes the downlink data that is transmitted from the base station in subframe n is received, the terminal transmits the uplink control information that includes HARQ ACK or NACK of the downlink data in subframe n+k to the base station through the PUCCH or PUSCH. In this case, "k" may be differently defined in accordance with the FDD or time division duplex (TDD) of the LTE system and the subframe configuration. As an example, in the case of an FDD LTE system, "k" is fixed to "4." On the other hand, in the case of a TDD LTE system, "k" may be changed in accordance with the subframe configuration and the subframe number. Further, during data transmission through a plurality of carriers, the k value may be differently applied in accordance with the TDD configuration of each carrier.

In the LTE system, unlike the downlink HARQ, the uplink HARQ adopts a synchronous HARQ scheme in which the data transmission time is fixed. That is, the uplink/downlink timing relationship among a physical uplink shared channel (PUSCH) that is a physical channel for transmitting uplink data, a PDCCH that is a preceding downlink control channel, and a physical hybrid indicator channel (PHICH) that is a physical channel in which a downlink HARQ ACK/NACK that corresponds to the PUSCH is transmitted may be transmitted or received according to the following rule.

If the terminal receives a PDCCH that includes uplink scheduling control information that is transmitted from the base station in subframe n or a PHICH in which the downlink HARQ ACK/NACK is transmitted, the terminal transmit uplink data that corresponds to the control information through the PUSCH in subframe n+k. In this case, "k" may be differently defined in accordance with the FDD or time division duplex (TDD) of the LTE system and the configuration thereof. As an example, in the case of an FDD LTE system, "k" may be fixed to "4." On the other hand, in the case of a TDD LTE system, "k" may be changed in accordance with the subframe configuration and the subframe number. Further, during data transmission through a plurality of carriers, the k value may be differently applied in accordance with the TDD configuration of each carrier.

Further, if the terminal receives a PHICH that includes information related to downlink HARQ ACK/NACK from the base station in subframe i, the PHICH corresponds to the PUSCH that is transmitted by the terminal in subframe i-k.

In this case, "k" may be differently defined in accordance with the FDD or TDD of the LTE system and the configuration thereof. As an example, in the case of an FDD LTE system, "k" is fixed to "4." On the other hand, in the case of a TDD LTE system, "k" may be changed in accordance with the subframe configuration and the subframe number. Further, during data transmission through a plurality of carriers, the k value may be differently applied in accordance with the TDD configuration of each carrier.

As described above, the wireless communication system has been described based on the LTE system, and the contents of the present disclosure are not limited to the LTE system, but may be applied to various wireless communication system, such as NR and 5G. Further, in an embodiment, in the case of applying the present disclosure to a different wireless communication system, the present disclosure may be applied to a system that uses a modulation scheme that corresponds to the FDD through changing the k value.

Figure 3:
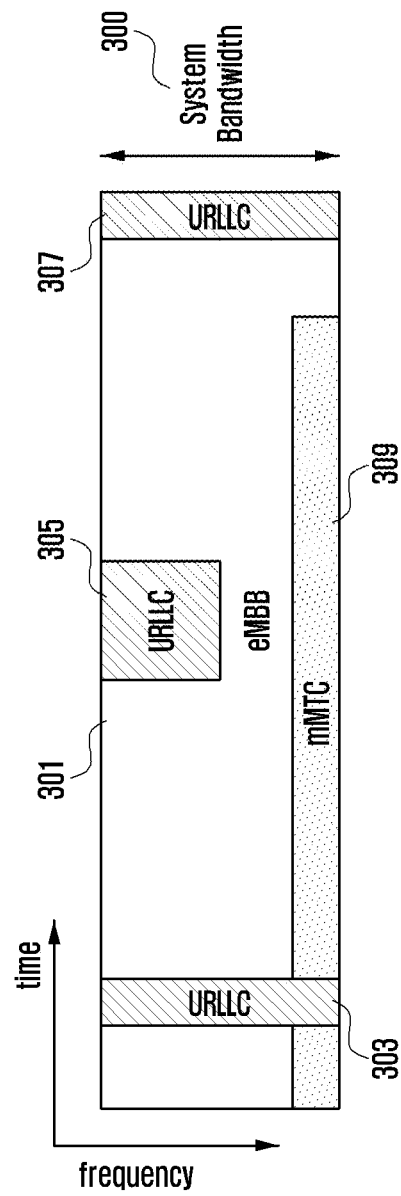
FIG. 3 illustrates a state where data for eMBB, URLLC, and mMTC are allocated with frequency-time resources in a communication system of the present disclosure.
Figure 4:
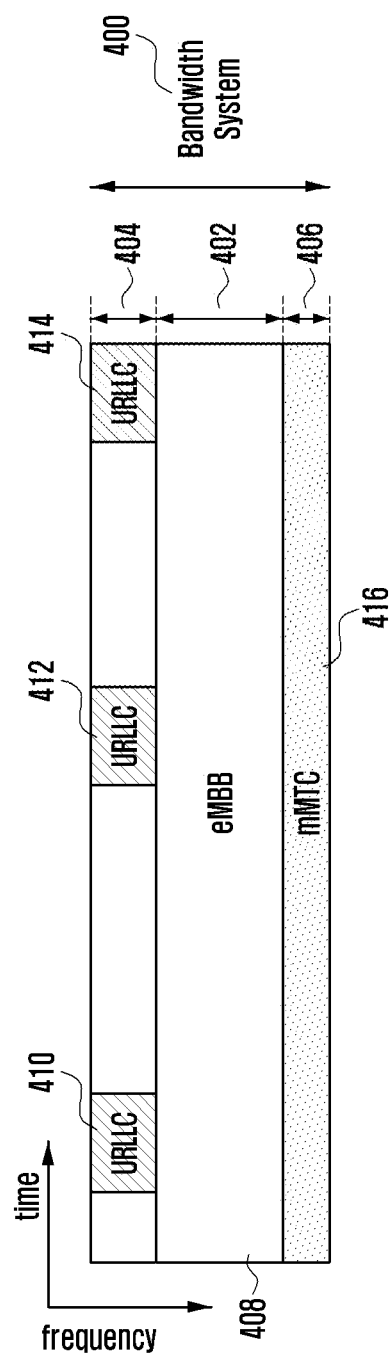
FIG. 4 illustrates another state where data for eMBB, URLLC, and mMTC are allocated with frequency-time resources in a communication system of the present disclosure.

FIGS. 3 and 4 illustrate a state where data for eMBB, URLLC, and mMTC, which are services that are considered in a 5G or NR system, are allocated with frequency-time resources.

Referring to FIGS. 3 and 4, it can be seen that frequency and time resources are allocated for information transmission in the respective systems.

First, FIG. 3 illustrates that data for eMBB, URLLC, and mMTC are allocated in the whole system frequency bandwidth 300. If URLLC data 303, 305, and 307 are generated while eMBB 301 and mMTC 309 are allocated and transmitted in a specific frequency bandwidth, and transmission of the generated data is necessary, it becomes possible to transmit the URLLC data 303, 305, and 307 without emptying a portion in which the eMBB 301 and the mMTC 309 have already been allocated or without transmitting the eMBB 301 and the mMTC 309. Since it is necessary to reduce a delay time of the URLLC during the service, the URLLC data 303, 305, and 307 may be allocated to a portion of an eMBB-allocated resource 301 to be transmitted. Of course, if the URLLC is additionally allocated to the eMBB-allocated resource to be transmitted, eMBB data may not be transmitted in the redundant frequency-time resources, and thus transmission performance of the eMBB data may be lowered. That is, in the above-described case, an eMBB data transmission failure due to the URLLC allocation may occur.

In FIG. 4, respective subbands 402, 404, and 406 that are obtained through division of the whole system frequency bandwidth 400 may be used for the purpose of transmitting services and data. The information related to a subband configuration may be predetermined, and this information may be transmitted from the base station to the terminal through higher layer signaling. Further, the information related to the subband may be optionally divided by the base station or a network node, and services may be provided to the terminal without transmission of separate subband configuration information to the terminal. FIG. 4 illustrates a state where subband 402 is used to transmit eMBB data, subband 404 is used to transmit URLLC data, and subband 406 is used to transmit mMTC data.

In the whole embodiment, the length of a transmission time interval (TTI) that is used for URLLC transmission may be shorter than the length of the TTI that is used to transmit the eMBB or mMTC. Further, a response to the information related to the URLLC may be transmitted earlier than that of the eMBB or the mMTC, and thus the information can be transmitted and received with a low delay.

Figure 5:
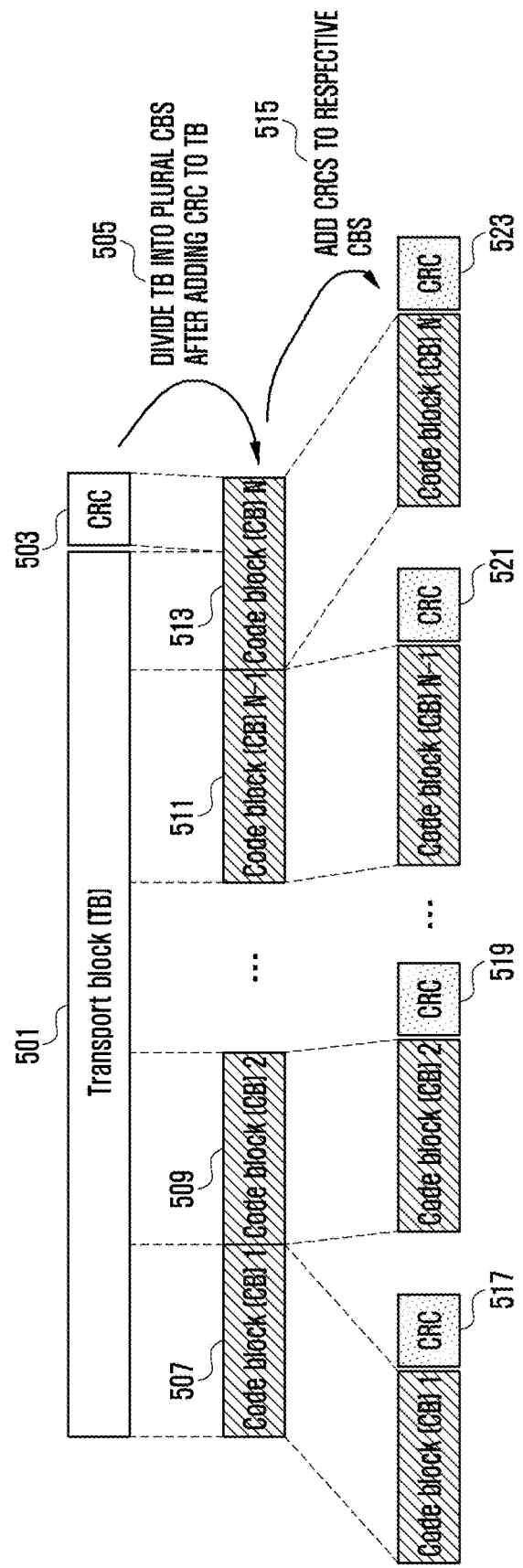
FIG. 5 illustrates a structure in which one transport block is divided into several code blocks and CRCs are added thereto according to an embodiment of the present disclosure.

FIG. 5 illustrates a process in which one transport block is divided into several code blocks and CRCs are added thereto.

Referring to FIG. 5, a CRC 503 may be added to the last or head portion of one transport block (TB) 501 to be transmitted in an uplink or a downlink. The CRC may be composed of 16 bits, 24 bits, or a prefixed bit number, or may be composed of a variable bit number in accordance with channel situations. The CRC may be used to determine whether to succeed in channel coding. The block 501 and 503 that includes the TB and the CRC added thereto may be divided into several code blocks (CBs) 507, 509, 511, and 513 (505). The divided code blocks may have predetermined sizes, and in this case, the last code block 513 may have a size that is smaller than the size of other blocks, or may be set to have the same length as the length of other blocks through putting 0, a random value, or 1 therein. CRCs 517, 519, 521, and 523 may be respectively added to the divided code blocks (515). The CRC may be composed of 16 bits, 24 bits, or a prefixed bit number, and may be used to determine whether to succeed in the channel coding. However, the CRC 503 that is added to the TB and the CRCs 517, 519, 521, and 523 that are added to the code blocks may be omitted in accordance with the kind of channel codes to be applied to the code blocks. For example, if an LDPC code rather than a turbo code is applied to the code blocks, the CRCs 517, 519, 521, and 523 to be inserted into the code blocks may be omitted. However, even if the LDPC is applied, the CRCs 517, 519, 521, and 523 may be added to the code blocks. Further, even if a polar code is used, the CRCs may be added or omitted.

Figure 6:
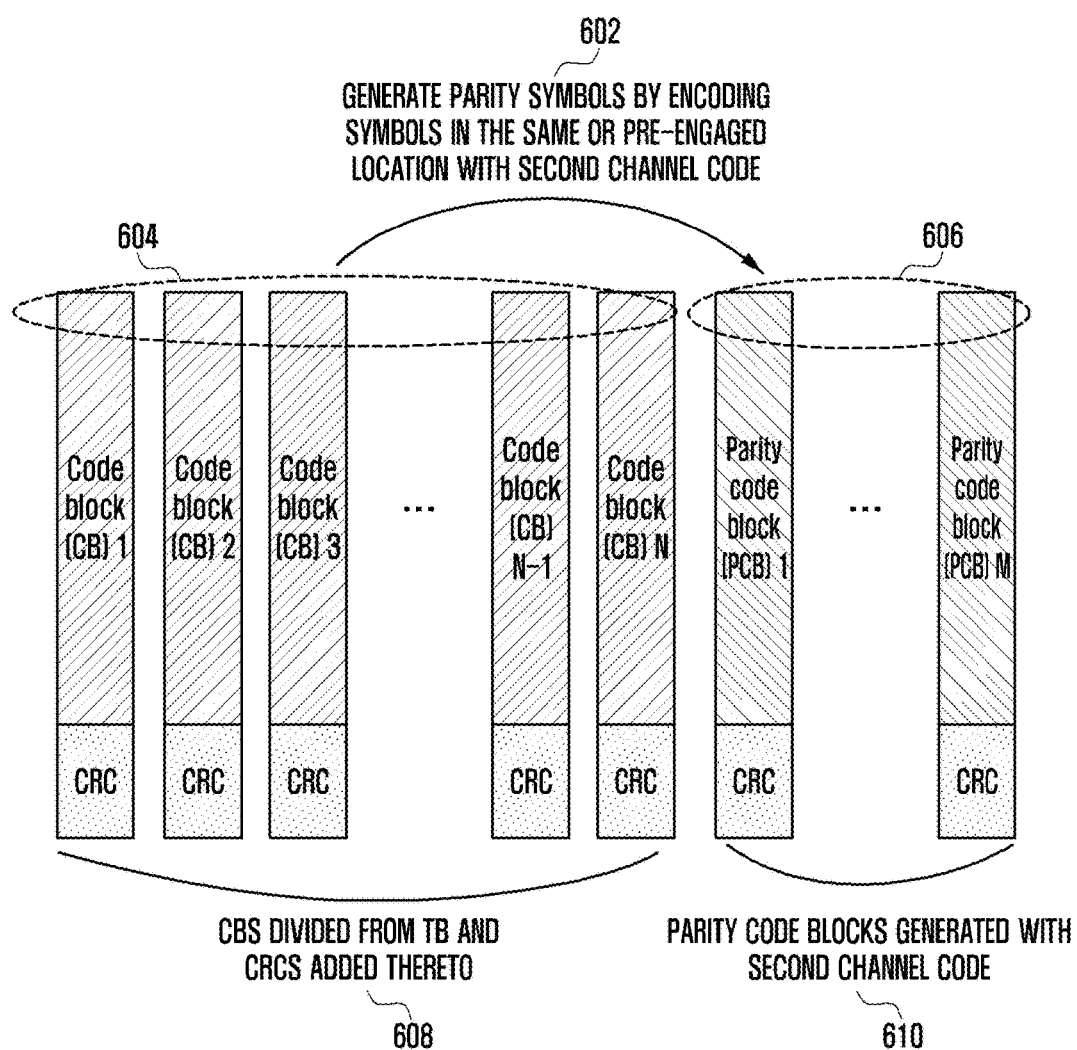
FIG. 6 illustrates a structure in which an outer code is applied to be coded according to an embodiment of the present disclosure.
Figure 7A:
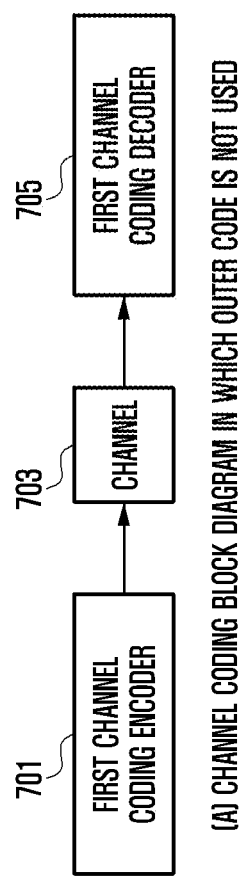
FIGS. 7A and 7B illustrate block diagrams depending on whether an outer code is applied according to an embodiment of the present disclosure.
Figure 7B:
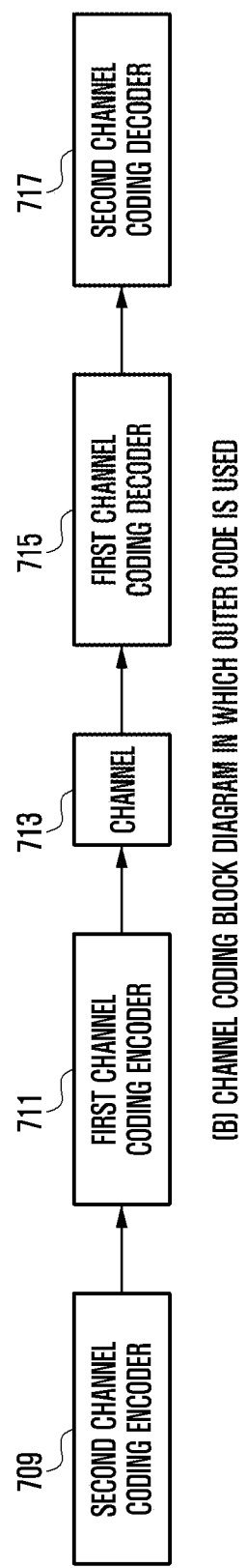

FIG. 6 illustrates a transmission scheme in which an outer code is used, and FIGS. 7A and 7B illustrate the structure of a communication system in which an outer code is used.

Referring to FIGS. 6, 7A and 7B, a method for transmitting a signal using an outer code will be described.

In FIG. 6, one transport block is divided into several code blocks, and bits or symbols 604 that are in the same location in the respective code blocks may be encoded with a second channel code to generate parity bits or symbols 606 (602). Thereafter, CRCs may be added to parity code blocks that are generated through encoding of the respective code blocks with the second channel code (608 and 610). Whether to add the CRCs may differ in accordance with the kind of the channel codes. For example, if a turbo code is used as a first channel code, the CRCs 608 and 610 are added, but thereafter, the respective code blocks and the parity code blocks may be encoded through first channel code encoding.

In the case where the outer code is used, data to be transmitted passes through a second channel coding encoder 709. Channel codes that are used for the second channel coding may be, for example, a Reed-Solomon code, a BCH code, a raptor code, and a parity bit generation code. The bits or symbols that have passed through the second channel coding encoder 709 as described above pass through a first channel coding encoder 711. A channel code that is used for the first channel coding may be a convolutional code, an LDPC code, a turbo code, or a polar code. If the channel-coded symbols pass through a channel 713 and are received in a receiver, the receiver side may successively operate a first channel coding decoder 715 and a second channel coding decoder 717 based on a received signal. The first channel coding decoder 715 and the second channel coding decoder 717 may perform operations that correspond to the operations of the first channel coding encoder 711 and the second channel coding encoder 709.

In contrast, in the channel coding block diagram in which the outer code is not used, only the first channel coding encoder 701 and the first channel coding decoder 705 are used in a transceiver, but the second channel coding encoder and the second channel coding decoder are not used. Even if the outer code is not used, the first channel coding encoder 711 and the first channel coding decoder 715 may be configured in the same manner as the case where the outer code is used.

Hereinafter, an eMBB service is called a first type service, and eMBB data is called first type data. The first type service or the first type data is not limited to the eMBB, but may correspond to a case where high-speed data transmission is required or broadband transmission is performed. Further, an URLLC service is called a second type service, and URLLC data is called second type data. The second type service or the second type data is not limited to the URLLC, but may correspond to a case where low latency is required or high-reliable transmission is necessary, or another system that requires both low latency and high reliability. Further, an mMTC service is called a third type service, and an mMTC data is called third type data. The third type service or the third type data is not limited to the mMTC, but may correspond to a case where low speed or wide coverage, or low power is required. Further, in explaining an embodiment, it may be understood that the first type service includes or does not include the third type service.

In order to transmit the three kinds of services or data as described above, physical layer channel structures that are used by types may differ from each other. For example, at least one of transmission time interval (TTI) lengths, frequency resource allocation units, control channel structures, and data mapping methods may differ from each other.

Although three kinds of services and three kinds of data have been described, more kinds of services and the corresponding data may exist, and even in this case, the contents of the present disclosure could be applied.

The terms "physical channel" and "signal" in the LTE or LTE-A system in the related art may be used to explain a method and an apparatus proposed in an embodiment. However, the contents of the present disclosure may be applied to a wireless communication system that is not the LTE or LTE-A system.

As described above, an embodiment proposes a detailed method for defining transmission/reception operations of a terminal and a base station for transmission of first, second, and third type services or data, and operating terminals, in which different types of services or data are scheduled, together in the same system. In the present disclosure, first, second, and third type terminals indicate terminals in which first, second, and third type services or data are scheduled. In an embodiment, the first, second, and third type terminals may be the same terminal or different terminals.

In an embodiment, at least one of an uplink scheduling grant signal and a downlink data signal is called a first signal. Further, in the present disclosure, at least one of an uplink data signal for the uplink scheduling grant and an HARQ ACK/NACK for the downlink data signal is called a second signal. In an embodiment, among signals that a base station transmits to a terminal, a signal that expects a response from the terminal may be the first signal, and a response signal of the terminal that corresponds to the first signal may be the second signal. Further, in an embodiment, a service of the first signal may be at least one service of eMBB, URLLC, and mMTC, and the second signal may also correspond to at least one of the above-described services.

In an embodiment, the TTI length of the first signal is a time value related to transmission of the first signal, and may indicate the length of time in which the first signal is transmitted. Further, in the present disclosure, the TTI length of the second signal is a time value related to transmission of the second signal, and may indicate the length of time in which the second signal is transmitted. Further, in the present disclosure, the TTI length of the third signal is a time value related to transmission of the third signal, and may indicate the length of time in which the third signal is transmitted. Further, in the present disclosure, the second signal transmission timing may be information on when the terminal transmits the second signal and when the base station receives the second signal, and may be called the second signal transmission/reception timing.

Further, in an embodiment, if it is assumed that the terminal transmits the second signal at the (n+k)-th TTI when the base station transmits the first signal at the n-th TTI, it corresponds to notification of a k value that the base station notifies the terminal of the second signal transmission timing. Further, if it is assumed that the terminal transmits the second signal at the (n+4+a)-th TTI when the base station transmits the first signal at the n-th TTI, it corresponds to notification of an offset value a that the base station notifies the terminal of the second signal transmission timing. An offset may be defined in various methods, such as n+4+a and n+5+a rather than n+4+a, and hereinafter, in the same manner as the value of n+4+a that is mentioned in the present disclosure, the offset value a may be defined in various methods.

The contents of the present disclosure are applicable to an FDD or TDD system.

Hereinafter, in the present disclosure, higher layer signaling is a signal transfer method in which the base station transfers a signal to the terminal using a downlink data channel of a physical layer, or the terminal transfers a signal to the base station using an uplink data channel of a physical layer, and may be mentioned as RRC signaling, PDCP signaling, or a MAC control element (MAC CE).

The first embodiment relates to a reception method of a terminal in the case where first type data and second type data are simultaneously provided from a downlink to one terminal.

Figure 8:
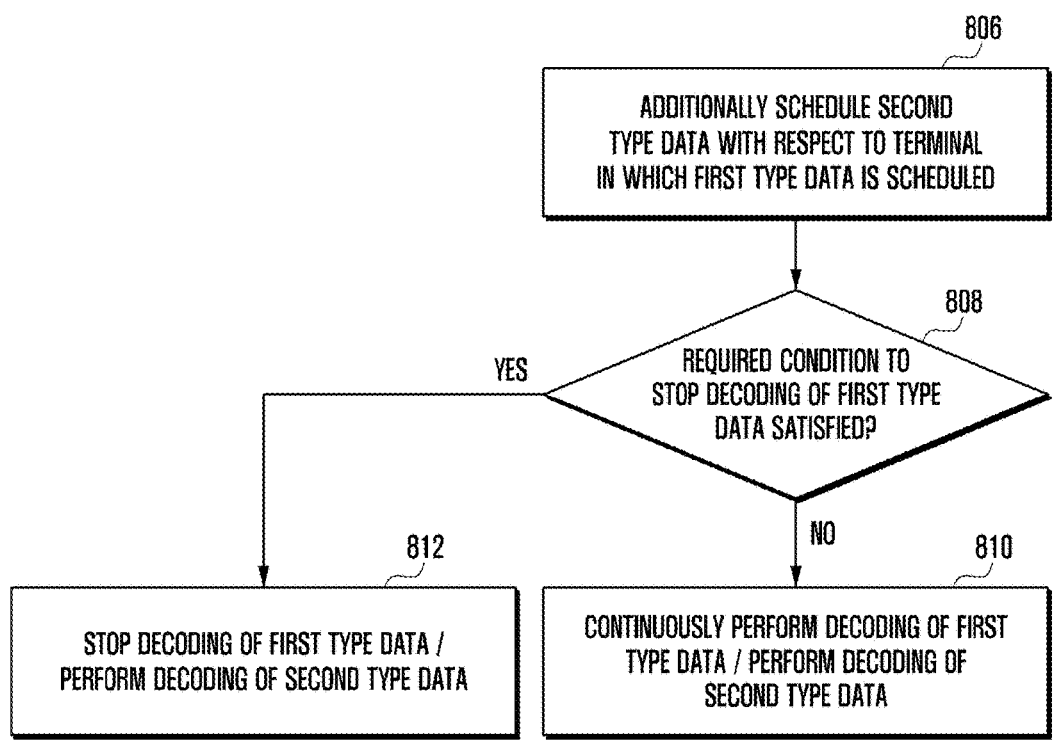
FIG. 8 illustrates an operation of a base station or a terminal according to a first embodiment of the present disclosure.

FIG. 8 illustrates an operation of a base station or a terminal according to an embodiment.

Referring to FIG. 8, operations of the base station and the terminal will be described in a system in which first type information and second type information are simultaneously provided. Hereinafter, the term "simultaneously provided" may mean that the second type data is also transmitted in a transmission time interval for transmitting the first type data, and the first type data and the second type data may be provided for the same terminal or different terminals.

At operation 806, the base station may additionally schedule the second type data in the terminal in which the first type data is scheduled, and the terminal may receive such scheduling information. More specifically, the base station may allocate second type data transmission to the terminal in which the first type data is scheduled or it is determined that the first type data is scheduled. In an embodiment, the scheduling information may be transmitted from the base station to the terminal through control information that includes information related to the corresponding type data transmission.

At operation 808, the terminal may determine whether a first type data decoding stop condition is satisfied. The determination of whether the condition is satisfied corresponds to the determination of whether to stop or continue the first type data decoding, and the detailed condition will be described later.

If the required condition is not satisfied, the terminal, at operation 810, may perform the first type data decoding and the second type data decoding together. Further, the terminal may transmit an HARQ ACK/NACK according to the result of the first type data decoding to the base station and may transmit an HARQ ACK/NACK according to the result of the second type data decoding to the base station in accordance with the result of the decoding.

If the required condition is satisfied, the terminal, at operation 812, may not perform the decoding of the first type data that has been pre-transmitted. Further, the terminal may stop the first type data decoding, and may perform the second type data decoding. Thereafter, the terminal may transmit the HARQ NACK to the base station in the determined timing. The HARQ NACK being transmitted may be related to the first type data. Further, in an embodiment, the terminal may transmit the HARQ ACK/NACK that corresponds to the decoded second type data to the base station in the timing that corresponds to the second type data.

In an embodiment, the required condition may be determined based on at least one of an MCS value that is indicated by the first type transmission control information, a TBS value, a TTI length, the number of layers, and the number of allocated RBs. Further, the required condition may be made based on at least one of an MCS value that is indicated by the first and second type transmission control information, a TBS value, a TTI length, the number of layers, and the number of allocated RBs.

For example, if a TBS value of the first type data that is scheduled in a specific terminal is equal to or larger than a specific value in a state where the second type data is simultaneously scheduled in the same terminal, the terminal does not perform the decoding of the first type data, and may additionally transmit the HARQ NACK to the base station in the determined timing. The HARQ NACK to the base station may not be transmitted by the terminal. If the HARQ NACK is not transmitted as described above, the base station may transmit retransmission data that corresponds to the corresponding first type data to the terminal in the predetermined timing. The predetermined timing may be engaged between the terminal and the base station.

As another example, if the number of RBs that are scheduled to transmit the first type data, that is, the size of a frequency domain resource, is equal to or larger than a predetermined value, the terminal may not perform the decoding of the first type data, and may additionally transmit the HARQ NACK to the base station in the determined timing. The HARQ NACK to the base station may not be transmitted by the terminal. If the HARQ NACK is not transmitted as described above, the base station may transmit the retransmission data that corresponds to the corresponding first type data to the terminal in the predetermined timing. The predetermined timing may be engaged between the terminal and the base station.

Further, in decoding the first type data, the terminal in which the first type data and the second type data are simultaneously scheduled may decode the first type data under that assumption that the first type data exists only in a place where a resource in which the second type data is scheduled is excluded from a resource in which the first type data is transmitted.

Further, in an embodiment, if the condition on which the first type data is not decoded is satisfied, the base station may transmit another piece of data to a part of a resource region allocated for transmission of the first type data, or may not transmit data to the corresponding resource region. Further, the base station may configure a part of the region allocated for transmission of the first type data to perform at least one of reference signal transmission for transmission of another type data and control information transmission. Further, in an embodiment, if the condition on which the first type data is not decoded is satisfied, the base station may transmit additional information related to the second type data to a part of the resource region allocated for transmission of the first type data. The additional information may include CRC information that is additionally allocated for transmission of the second type data.

Further, the terminal in which the first type data and the second type data are simultaneously scheduled may determine whether to decode the first type data based on whether a response to the second type data can be transmitted within a predetermine time. More specifically, in the case of the second type data, a low-delay response transmission is necessary, and thus if the first type data and the second type data are simultaneously scheduled, it is necessary for the terminal to preferentially execute processing for transmitting a response to the second type data. Accordingly, it is possible to determine whether to decode the first type data based on whether it is possible to transmit the response to the second type data to match the predetermined condition. If the terminal does not perform decoding of the first type data in order to transmit the response to the second type data, it may transmit the HARQ NACK for the first type data to the base station in the predetermined timing.

Although the above-described embodiment explains the method for the terminal in which the first type data and the second type data are simultaneously scheduled to determine whether to decode the first type data in accordance with the predetermined condition, it would be possible to determine whether to decode the second type data in accordance with different conditions through easy modifications.

Figure 9:
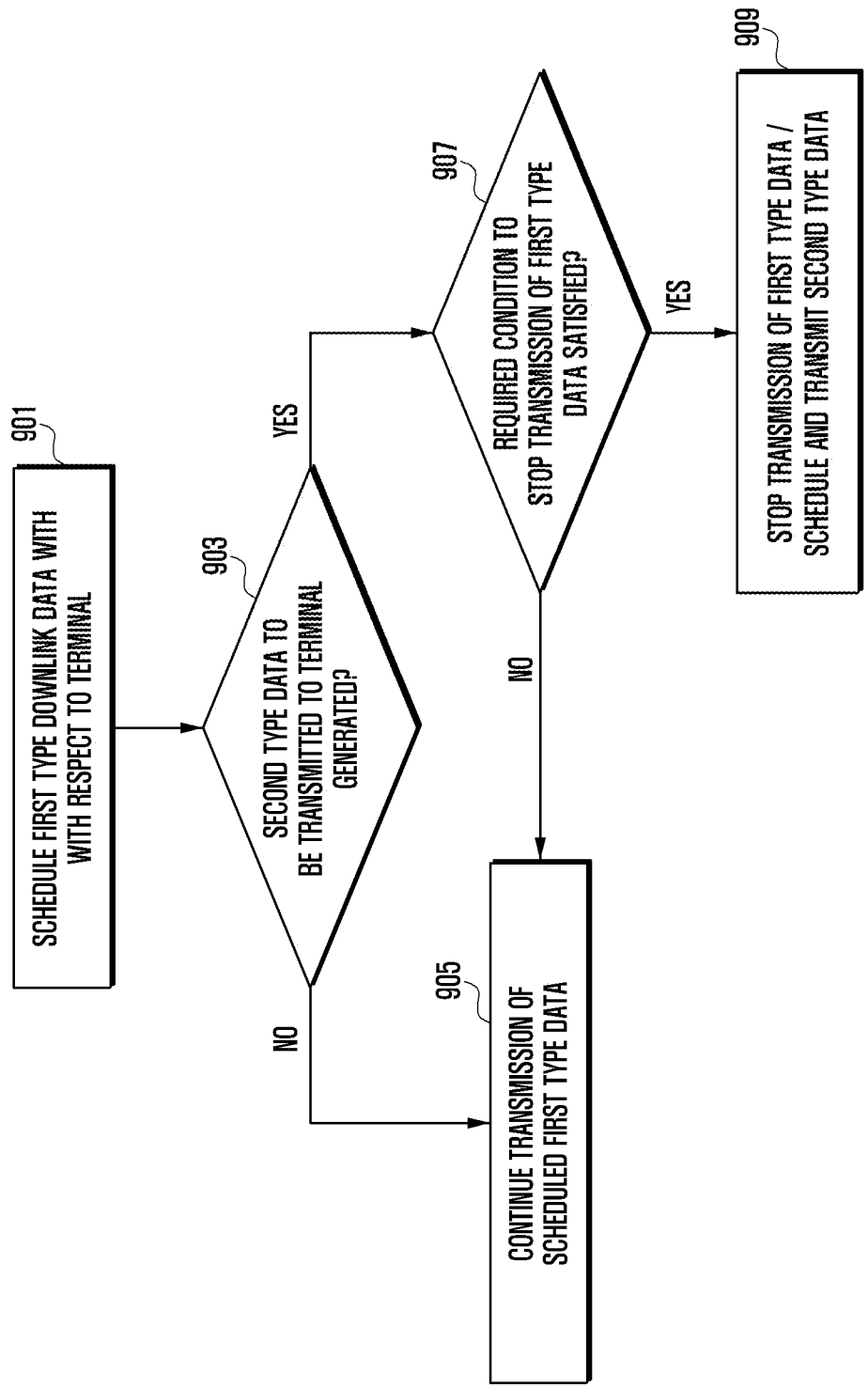
FIG. 9 illustrates another operation of a base station or a terminal according to a second embodiment of the present disclosure.

FIG. 9 illustrates another operation of a base station or a terminal according to an embodiment.

Referring to FIG. 9, the second embodiment describes a transmission method of a base station in the case where first type data and second type data are simultaneously provided from a downlink to one terminal. In the embodiment, the term "~simultaneously provided" may include that the second type data is also transmitted in a transmission time interval for transmitting the first type data.

At operation 901, the base station may schedule the first type downlink data in the terminal.

At operation 903, the base station may confirm whether second type data is generated to be additionally transmitted to the terminal in which the first type data is scheduled in the same transmission time interval. In an embodiment, the second type data may be transmitted to the same terminal, and may be transmitted to a resource region for transmission of the scheduled first type data.

In an embodiment, if the second type data is not generated, the base station, at operation 905, continues the transmission of the scheduled first type data.

If second type data is generated to be additionally transmitted to the terminal in which the first type data is scheduled 901 in the same transmission time interval, the base station, at operation 907, may determine whether a required condition to stop transmission of the first type data is satisfied. To stop the transmission of the first type data may mean not to transmit the already scheduled first type data that is to be transmitted after a start of transmission of the second type data. The required condition 907 to stop the transmission of the first type data may be determined based on at least one of an MCS value that is indicated by the first type transmission control information, a TBS value, a TTI length, the number of layers, and the number of allocated RBs, and may be determined in accordance with the condition as described above in the previous embodiment.

If the required condition to stop the transmission of the first type data is not satisfied, the base station, at operation 905, may continue the transmission of the scheduled first type data. Further, in an embodiment, the base station may perform the transmission of the second type data while continuing the transmission of the first type data. More specifically, the base station may perform the transmission of the second type data with respect to a part of the resource region that is allocated for the transmission of the first type data, and may perform the transmission of the first type data with respect to the remaining region. Accordingly, the terminal is able to transmit an HARQ ACK/NACK for at least one of the first type data and the second type data in accordance with the situation.

If the required condition to stop the transmission of the first type data is satisfied, the base station, at operation 909, may stop the transmission of the first type data, and may perform scheduling for the transmission of the second type data and the data transmission.

In an embodiment, if a TBS value of the scheduled first type data in a specific terminal is equal to or larger than a specific value, and the second type data is scheduled in the same terminal at the same time, the base station may stop the transmission of the first type data. If the required condition to stop the transmission of the first type data is confirmed and satisfied, the base station may stop the transmission of the scheduled first type data, schedule the transmission of the generated second type data, and transmit control information and data. If the required condition to stop the transmission of the first type data is confirmed not to be satisfied, the base station continues the transmission of the scheduled first type data.

As an example, in this embodiment, after confirming whether the required condition to stop the transmission of the first type data is satisfied and stopping the transmission of the first type data, the base station may transmit the control signal or data to another terminal. Further, if the existing first type data transmission time interval remains after the base station stops the transmission of the first type data to the existing scheduled terminal and transmits the second type data, the base station may not transmit the pre-allocated first type data for the remaining time to save an electric power.

The third embodiment relates to a method for transmitting HARQ ACK or NACK information for determining whether transmission of first type data for a downlink and an uplink has succeeded in the unit of a code block other than the unit of a transport block. Explanation of the third embodiment is not limited to that in the first consideration of transmission of first type data, but the features of the third embodiment may be applied even to transmission of second and third type data, or other type data.

Figure 10:
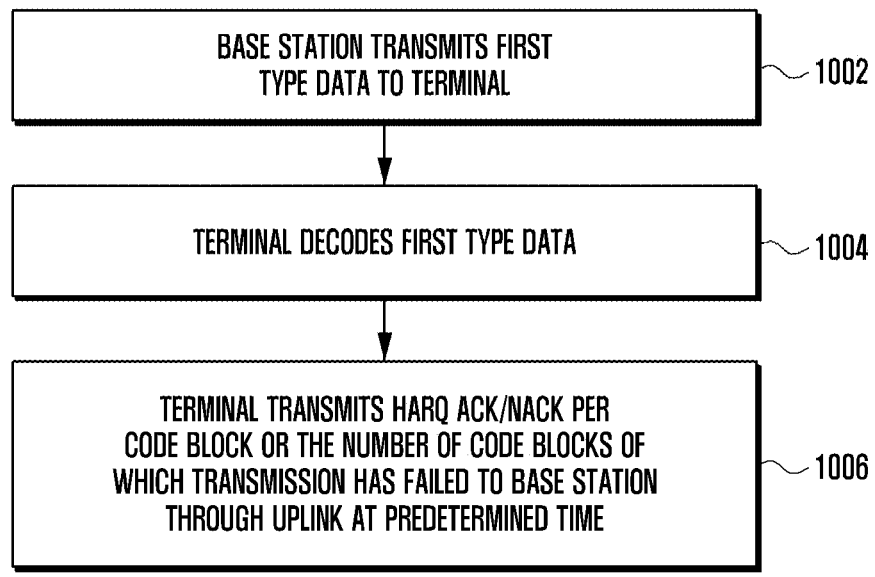
FIG. 10 illustrates a downlink transmission procedure according to a third embodiment of the present disclosure.

FIG. 10 illustrates an operation of a base station or a terminal that is related to a downlink transmission procedure according to an embodiment. Referring to FIG. 10, at operation 1002, a base station may schedule and transmit first type data to a terminal.

At operation 1004, the terminal may decide the first type data (1004). In an embodiment, the terminal may determine whether decoding of code blocks that correspond to the first type data has succeeded.

At operation 1006, the terminal may transmit to the base station the number of code blocks of which the decoding has failed or HARQ ACK/NACK information for each code block. The code block may mean a channel coding unit, such as a convolutional code, a turbo code, an LDPC code, or a polar code.

Figure 11:
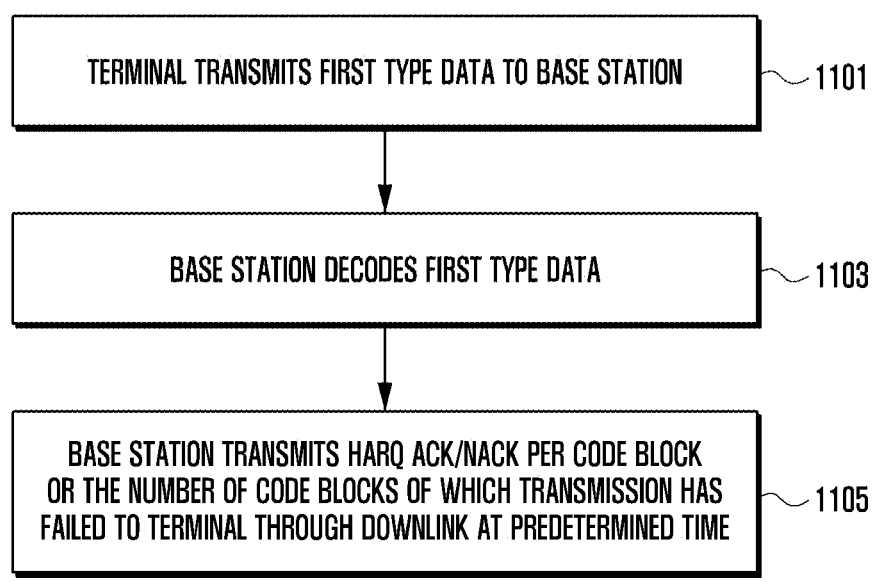
FIG. 11 illustrates an uplink transmission procedure according to a third embodiment of the present disclosure.

FIG. 11 illustrates an operation of a base station or a terminal that is related to an uplink transmission procedure according to an embodiment.

Referring to FIG. 11, an uplink data transmission method will be described.

At operation 1101, a terminal may transmit first type data to a base station.

At operation 1103, the base station may decode the first type data, and may determine whether the decoding of code blocks that correspond to the first type data has succeeded. More specifically, in an embodiment, the base station may determine whether the decoding of the code blocks that correspond to the first type data has succeeded.

At operation 1105, the base station may transfer to the terminal the number of code blocks of which the decoding has failed or HARQ ACK/NACK information for each code block. The code block may mean a channel coding unit, such as a convolutional code, a turbo code, an LDPC code, or a polar code.

In order to perform the above-described embodiments, the terminal or the base station may include a transmitter, a receiver, and a processor. In the first to third embodiments as described above, the transmission/reception methods of the base station and the terminal have been described to determine the transmission/reception timing of a second signal and to perform corresponding operations, and the transmitter, the receiver, and the processor may perform the above-described operations. In an embodiment, the transmitter and the receiver may be mentioned as a transceiver unit that can perform both their functions, and the processor may be mentioned as a controller.

Figure 12:
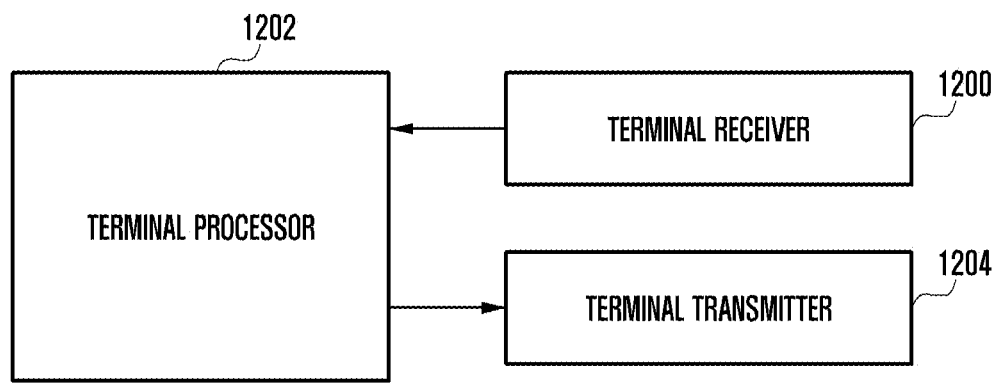
FIG. 12 illustrates a structure of a terminal according to embodiments of the present disclosure.

FIG. 12 illustrates the structure of a terminal according to an embodiment of the present disclosure.

Referring to FIG. 12, a terminal according to the present disclosure may include a terminal receiver 1200, a terminal transmitter 1204, and a terminal processor 1202. In an embodiment, the terminal receiver 1200 and the terminal transmitter 1204 may be commonly called a transceiver unit. The transceiver unit may transmit/receive a signal with a base station. The signal may include control information and data. For this, the transceiver unit may be composed of an RF transmitter for up-converting the frequency and amplifying of a transmitted signal, and an RF receiver for low-noise-amplifying a received signal and down-converting the frequency of the received signal. Further, the transceiver unit may receive a signal through a radio channel, and may output the received signal to the terminal processor 1202. The transceiver unit may also transmit the signal that is output from the terminal processor 1202 through the radio channel. The terminal processor 1202 may control a series of processes so as to operate according to the above-described embodiments. For example, the terminal receiver 1200 may operate to receive a signal that includes second signal transmission timing information from the base station, and the terminal processor 1202 may operate to analyze the second signal transmission timing. Thereafter, the terminal transmitter 1204 may transmit the second signal in the above-described timing.

Figure 13:
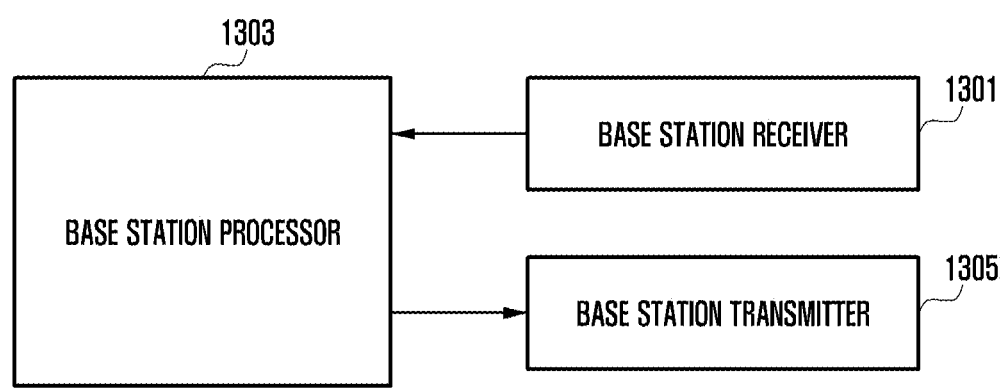
FIG. 13 illustrates a structure of a base station according to embodiments of the present disclosure.

FIG. 13 illustrates the structure of a base station according to an embodiment of the present disclosure.

Referring to FIG. 13, a base station according to an embodiment may include at least one of a base station receiver 1301, a base station transmitter 1305, and a base station processor 1303. In an embodiment of the present disclosure, the base station receiver 1301 and the base station transmitter 1305 may be commonly called a transceiver unit. The transceiver unit may transmit/receive a signal with a terminal. The signal may include control information and data. For this, the transceiver unit may be composed of an RF transmitter for up-converting and amplifying the frequency of a transmitted signal, and an RF receiver for low-noise-amplifying and down-converting the frequency of a received signal. Further, the transceiver unit may receive a signal through a radio channel, and may output the received signal to the base station processor 1303. The transceiver unit may also transmit the signal that is output from the base station processor 1303 through the radio channel. The base station processor 1303 may control a series of processes so as to operate according to the above-described embodiments. For example, the base station processor 1303 may operate to determine the second signal transmission timing, and to generate the second signal transmission timing information to be transferred to the terminal. Thereafter, the base station transmitter 1305 may transfer the timing information to the terminal, and the base station receiver 1301 may receive the second signal in the above-described timing.

Further, according to an embodiment of the present disclosure, the base station processor 1303 may operate to generate downlink control information (DCI) that includes the second signal transmission timing information. In this case, the DCI may indicate the second signal transmission timing information.

The embodiments of the present disclosure that are described in the specification and drawings are merely for easy explanation of the technical contents of the present disclosure and proposal of specific examples to help understanding of the present disclosure, but are not intended to limit the scope of the present disclosure. That is, it will be apparent to those of ordinary skill in the art to which the present disclosure pertains that other modified examples that are based on the technical idea of the present disclosure can be embodied. Further, according to circumstances, the respective embodiments may be operated in combination. For example, parts of the first, second, and third embodiments of the present disclosure may be combined with each other to operate the base station and the terminal. Further, although the above-described embodiments have been proposed based on an NR system, other modified examples based on the technical idea of the above-described embodiments may be embodied in other systems, such as FDD and TDD LTE systems.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method of a terminal in a mobile communication system, the method comprising:
   receiving, from a base station, first control information scheduling first type data;
   receiving, from the base station, second control information scheduling second type data; and
   receiving, from the base station, the first type data and the second type data, the second type data being received in a transmission time interval (TTI) for receiving the first type data; and
   determining whether to stop decoding of the first type data based on a first type data decoding stop condition,
   wherein a resource region for receiving the second type data is allocated to at least a part of a resource region allocated for receiving the first type data.

2. The method of claim 1, further comprising:
   performing decoding of the first type data and the second type data, transmitting, to the base station, feedback information on the first type data, and transmitting, to the base station, feedback information on the second type data in case that the first type data decoding stop condition is not satisfied; and
   stopping decoding of the first type data and performing decoding of the second type data and transmitting, to the base station, feedback information, which indicates a negative acknowledgement, on the first type data in case that the first type data decoding stop condition is satisfied.

3. The method of claim 1, wherein in case that a transport block size (TBS) of the first type data is larger than a specific value or a number of resource blocks (RBs) for receiving the first type data is larger than a threshold value, the first type data decoding stop condition is satisfied.

4. The method of claim 1, wherein the second type data is a data for a case in which at least one of low latency or high-reliability is required.

5. A method of a base station in a mobile communication system, the method comprising:
   transmitting, to a terminal, first control information scheduling first type data;
   identifying whether second type data to be transmitted to the terminal in a transmission time interval (TTI) for transmitting the first type data exists or not;
   determining whether to terminate a transmission of the first type data based on a condition to terminate the transmission of the first type data, in case that the second type data exists; and
   transmitting at least one of the first type data and the second type data based on the determination,
   wherein a resource region for receiving the second type data is allocated to at least a part of a resource region allocated for receiving the first type data.

6. The method of claim 5,
   wherein the first type data is transmitted in case that the condition is not satisfied and the first type data and the second type data are transmitted in case that the condition is satisfied, and
   wherein the second type data is transmitted on a part of resource allocated for the transmission of the first type data in the TTI.

7. The method of claim 5, wherein the second type data is a data for a case in which at least one of low latency or high-reliability is required.

8. The method of claim 5, wherein in case that a transport block size (TBS) of the first type data is larger than a specific value or a number of resource blocks (RBs) for transmitting the first type data is larger than a threshold value, the condition to terminate the transmission of the first type data is satisfied.

9. The method of claim 5, further comprising:
identifying a capability of the terminal associated with transmitting a response to the second type data within a predetermined time; and
transmitting, to the terminal, the first type data and the second type data based on the capability of the terminal.

10. A terminal in a mobile communication system, the terminal comprising:
a transceiver; and
a controller coupled with the transceiver and configured to:
receive, from a base station, first control information scheduling first type data,
receive, from the base station, second control information scheduling second type data,
receive the first type data and the second type data from the base station, the second type data being received in a transmission time interval (TTI) for receiving the first type data, and
determine whether to stop decoding of the first type data based on a first type data decoding stop condition,
wherein a resource region for receiving the second type data is allocated to at least a part of a resource region allocated for receiving the first type data.

11. The terminal of claim 10, wherein the controller is further configured to:
perform decoding of the first type data and the second type data, transmitting, to the base station, feedback information on the first type data, and transmitting, to the base station, feedback information on the second type data in case that the first type data decoding stop condition is not satisfied, and
stop decoding of the first type data and performing decoding of the second type data and transmitting, to the base station, feedback information, which indicates a negative acknowledgement, on the first type data in case that the first type data decoding stop condition is satisfied.

12. The terminal of claim 10, wherein in case that a transport block size (TBS) of the first type data is larger than a specific value or a number of resource blocks (RBs) for receiving the first type data is larger than a threshold value, the first type data decoding stop condition is satisfied.

13. The terminal of claim 10, wherein the second type data is a data for a case in which at least one of low latency or high-reliability is required.

14. A base station in a mobile communication system, the base station comprising:
a transceiver; and
a controller coupled with the transceiver and configured to:
transmit, to a terminal, first control information scheduling first type data,
identify whether second type data to be transmitted to the terminal in a transmission time interval (TTI) for transmitting the first type data exists or not,
determine whether to terminate a transmission of the first type data based on a condition to terminate the transmission of the first type data, in case that the second type data exists, and
transmit at least one of the first type data and the second type data based on the determination,
wherein a resource region for receiving the second type data is allocated to at least a part of a resource region allocated for receiving the first type data.

15. The base station of claim 14, wherein the first type data is transmitted in case that the condition is not satisfied and the first type data and the second type data are transmitted in case that the condition is satisfied, and
wherein the second type data is transmitted on a part of resource allocated for the transmission of the first type data in the TTI.

16. The base station of claim 14, wherein the second type data is a data for a case in which at least one of low latency or high-reliability is required.

17. The base station of claim 14, wherein in case that a transport block size (TBS) of the first type data is larger than a specific value or a number of resource blocks (RBs) for transmitting the first type data is larger than a threshold value, the condition to terminate the transmission of the first type data is satisfied.

18. The base station of claim 14, wherein the controller is further configured to:
identify a capability of the terminal associated with transmitting a response to the second type data within a predetermined time, and
transmits, to the terminal, the first type data and the second type data to the terminal based on the capability of the terminal.

* * * * *